United States Patent
Tachibana et al.

(10) Patent No.: US 6,460,690 B1
(45) Date of Patent: Oct. 8, 2002

(54) ROLLER CONVEYER

(75) Inventors: Katsuyoshi Tachibana; Yoshio Kikukawa; Takayoshi Moriyama, all of Tokyo (JP)

(73) Assignee: Hirata Corporation (JP)

(*) Notice: Subject to any disclaimer, the term of this patent is extended or adjusted under 35 U.S.C. 154(b) by 52 days.

(21) Appl. No.: 09/631,933

(22) Filed: Aug. 3, 2000

(30) Foreign Application Priority Data

Dec. 17, 1999 (JP) .......................................... 11-360025

(51) Int. Cl.$^7$ ............................................... B65G 13/06
(52) U.S. Cl. ...................................................... 198/791
(58) Field of Search ................................. 198/831, 780, 198/781.07, 791

(56) References Cited

U.S. PATENT DOCUMENTS

| | | | | |
|---|---|---|---|---|
| 597,114 A | * | 1/1898 | Jamieson ................. | 198/791 X |
| 891,126 A | * | 6/1908 | Worth ....................... | 198/791 |
| 1,749,431 A | * | 3/1930 | Johnson ................... | 198/791 |
| 2,448,514 A | * | 9/1948 | Butler ...................... | 198/791 X |
| 5,485,911 A | | 1/1996 | Kettelson et al. .......... | 198/791 |
| 5,762,177 A | * | 6/1998 | Baker et al. .............. | 198/781.07 |
| 6,158,574 A | * | 12/2000 | Williams et al. ............ | 198/791 |

FOREIGN PATENT DOCUMENTS

| | | | | |
|---|---|---|---|---|
| EP | 335216 | * | 10/1989 | ................. 198/791 |
| JP | 8-18656 | | 2/1996 | |

* cited by examiner

Primary Examiner—James R. Bidwell
(74) Attorney, Agent, or Firm—Lorusso & Loud

(57) ABSTRACT

A roller conveyer includes a motor and a plurality of rollers which are disposed on at least opposing lateral sides of the conveyance path and are adapted to convey articles on and along the conveyance path through rotation thereof. The rollers disposed on at least one side of the conveyance path each include a roller body and a first gear attached coaxially to the roller body. The roller body and the first gear may rotate either together or in a state in which relative sliding rotation therebetween. Adjacent first gears are interlockingly engaged, via one or more second gears disposed therebetween, to thereby rotate the rollers concurrently. Rotational torque of the motor is input directly or indirectly to any one of the first gears. The motor is preferably disposed at an intermediate portion in the direction of conveyance.

19 Claims, 18 Drawing Sheets

(a)

(b)

(c)

ROLLER CONVEYER

BACKGROUND OF THE INVENTION

1. Field of the Invention

The present invention relates to an improvement in a roller conveyer for conveying articles employed in industrial production lines, civil engineering or construction sites, and various other fields.

2. Description of the Related Art

Conventionally, chain-driven roller conveyers have been in wide use. Such a chain-driven roller conveyer includes rollers, sprockets fixedly attached to the roller shafts of the rollers, and a chain fitted around the sprockets. A single motor drives the chain so as to rotate the rollers, thereby conveying articles on the rollers. In some cases, the roller conveyer may assume the form of a free-flow conveyer. Specifically, the rollers can rotate about the corresponding shafts, while sliding relative thereto, so that articles being conveyed can be accumulated on the conveyer.

In this conventional chain-driven roller conveyer, elongation of the chain occurs with long-term use and the chain length must be adjusted. Also, running of the chain raises a noise problem. The chain-driven roller conveyer is generally intended to convey articles linearly on a horizontal plane. When the chain-driven roller conveyer is to have a vertically curved conveyance path surface (up-and-down conveyer), the structure thereof unavoidably becomes very complex. Also, the structural features of the chain-driven roller conveyer do not allow for a curved conveyer.

Recently, a shaft-driven roller conveyer has begun to replace a chain-driven roller conveyer. FIG. 20 shows a shaft-driven roller conveyer 01. As shown in FIG. 20, a shaft 040 extends in the direction of conveyance and is rotated by means of a motor 018. Bevel gears 041 are fixedly attached to the shaft 040 at positions corresponding to rollers 06 on one lateral side of the conveyance path. The bevel gears 041 convert rotation of the shaft 040 to rotation of corresponding roller shafts 042, which extend perpendicular to the shaft 040, thereby rotating the rollers 06 at opposing ends of the shafts 042 (lateral side of the conveyance path).

This shaft-driven roller conveyer does not require adjustment of chain length and features produces less noise as compared with a chain-driven roller conveyer. However, a mechanism for changing direction of rotation and including the bevel gears 041 has a relatively complex structure. Moreover, the width of the drive mechanism accounts for a relatively large percentage of the width of the conveyer, thus limiting the width of the conveyance path surface, i.e., thus being disadvantageous in terms of space efficiency. Also, since the shaft 040 is straight, the shaft-driven roller conveyer cannot have a horizontally or vertically curved conveyance path surface.

SUMMARY OF THE INVENTION

An object of the present invention is to solve the above-mentioned problems involved in the conventional roller conveyers and to provide a roller conveyer having a simple, compact power transmission mechanism, facilitating change in specifications, easily taking the form of a curved conveyer or an up-and-down conveyer, facilitating maintenance, and reducing cost of manufacture.

To achieve the above object, the present invention provides a roller conveyer adapted to convey articles on and along a conveyance path. The roller conveyer comprises a motor and a plurality of rollers which are disposed on at least at opposing lateral sides of the conveyance path and are adapted to convey articles on and along the conveyance path through rotation thereof. The rollers disposed on at least one lateral side of the conveyance path each comprise a roller body and a first gear attached coaxially to the roller body. The roller body and the first gear may rotate either together or with relative sliding rotation (slippage) therebetween. Adjacent first gears are interlockingly engaged to thereby rotate the rollers concurrently. Rotational torque of the motor is input directly or indirectly to any one of the first gears.

Through employment of the above-described conveyer configuration, the output shaft of the motor (the motor shaft or the output shaft of a speed reducer when the motor shaft or the motor is equipped therewith) and the shafts of the first gears can be disposed on the common conveyance path surface while being oriented in the same direction perpendicular to the direction of conveyance. Thus, the rotation transmission mechanism can be a simplified structure and compact, thereby reducing the cost of manufacture of the conveyer. Since the conveyer of the present invention does not use bevel gears, which are expensive, the cost of manufacture thereof can be further reduced even though the number of gears used is equal to that in a conventional counterpart. In contrast to a bevel gear system, the gears are engaged such that the shafts thereof are oriented in the same direction, thereby achieving a higher efficiency in transmission of torque.

All the first gears are interlockingly engaged while the motor is connected directly or indirectly to any one or more of the first gears, thereby causing all the rollers to effect a conveying operation. In order to increase conveyance power, a plurality of motors may be connected to a plurality of any first gears in the same manner. Thus, since the number of motors and the first gears to which the motors are connected is not particularly limited, the specifications of the roller conveyer can be flexibly modified.

A motor drive unit is not necessarily disposed at the upstream or downstream end of the conveyer, but may be disposed at an intermediate portion of the conveyance path. Thus, there is no need to reserve space for the motor drive unit or a tail unit in addition to space for the conveyance path, thereby economizing on space.

Furthermore, the conveyer of the present invention does not require adjustment of chain tension, which becomes necessary for the conventional chain-driven roller conveyer after long-term use thereof, thereby facilitating maintenance.

Preferably, the adjacent first gears are interlockingly engaged by means of a single or a plurality of second gears interposed therebetween. As a result, through modification of the diameter or number of the second gears, the roller pitch can be modified freely, thereby enabling further flexibility in modification of roller conveyer specifications. Since the output shaft of the motor, the shaft of the first gear, and the shaft of the second gear can be disposed on the common conveyance path surface while being oriented in the same direction, perpendicular to the direction of conveyance, the rotation transmission mechanism can be a simplified structure and compact, thereby reducing the cost of manufacture of the conveyer.

Preferably, at least either the first gears or the second gears each have a diameter which varies in the direction of an axis of rotation, so as to curve the conveyance path.

As a result, a curved conveyer can be manufactured easily. Through modification of the varying degree of gear diameter, the curvature of a curved conveyer can be modified easily, so that a curved conveyer having a desired curvature can be manufactured easily.

Preferably, a plurality of rollers are gradually and sequentially varied in height of rotation axis above a common horizontal plane along the direction of conveyance of the conveyance path so as to vertically curve the surface of the conveyance path. As a result, an up-and-down conveyer can be manufactured easily. Through modification of the degree of ascent or descent or through employment of various combinations of ascent and descent, the shape of the conveyance path surface can be freely designed.

Preferably, the motor is disposed at an intermediate portion of the conveyance path with respect to the direction of conveyance to minimize load accumulated in gears located in the vicinity of the motor decreases, thereby improving efficiency in transmission of conveyance power. Since the durability of gears is improved, the strength of gear material can be decreased accordingly, thereby reducing cost of manufacture of the conveyer.

Preferably, the roller conveyer is divided into a plurality of conveyer sections in the direction of conveyance along the conveyance path. Engagement of adjacent first gears is broken at a boundary between adjacent conveyer sections and at least one conveyer section equipped with a motor can change the direction of conveyance.

As a result, the various conveyer sections can assume different structure and operation. For example, the conveyer sections can be motor-driven or manually driven; a certain conveyer section may be stopped while other conveyer sections remain in operation; and one or more motor-driven conveyer sections can change the direction of conveyance. Thus, a single roller conveyer can provide for selection from among various forms of conveyance. In other words, a single roller conveyer can provide a plurality of different functions.

Preferably, another conveyer is disposed in the vicinity of the conveyer section capable of changing the direction of conveyance such that articles conveyed thereon can be transferred onto the conveyer section from a direction perpendicular to the direction of conveyance of the conveyer section. As a result, it becomes possible to provide a conveyer facility in which the direction of conveyance of each article can be changed between opposing directions of conveyance perpendicular to the initial conveyance path.

The present invention further provides a roller conveyer adapted to convey articles on and along a conveyance path. The roller conveyer comprising a motor and a plurality of rollers which are disposed along the conveyance path and are adapted to convey articles on and along the conveyance path through rotation thereof. The rollers each comprise a roller body having a length corresponding to the width of the conveyance path, and a first gear located on at least one side of the conveyance path and attached coaxially to the roller body. The roller body and the first gear rotate either together or with relative rotation therebetween. The adjacent first gears are interlockingly engaged to thereby rotate the rollers concurrently. Rotational torque of the motor is input directly or indirectly to any one or more of the first gears. The roller conveyer of this latter embodiment can convey articles of any size not greater than the width of the conveyance path and provides effects similar to those yielded by the previously-described embodiment.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will next be described in detail with reference to the drawings.

First, a first embodiment of the present invention will next be described with reference to FIGS. 1 to 10.

Figure 1:
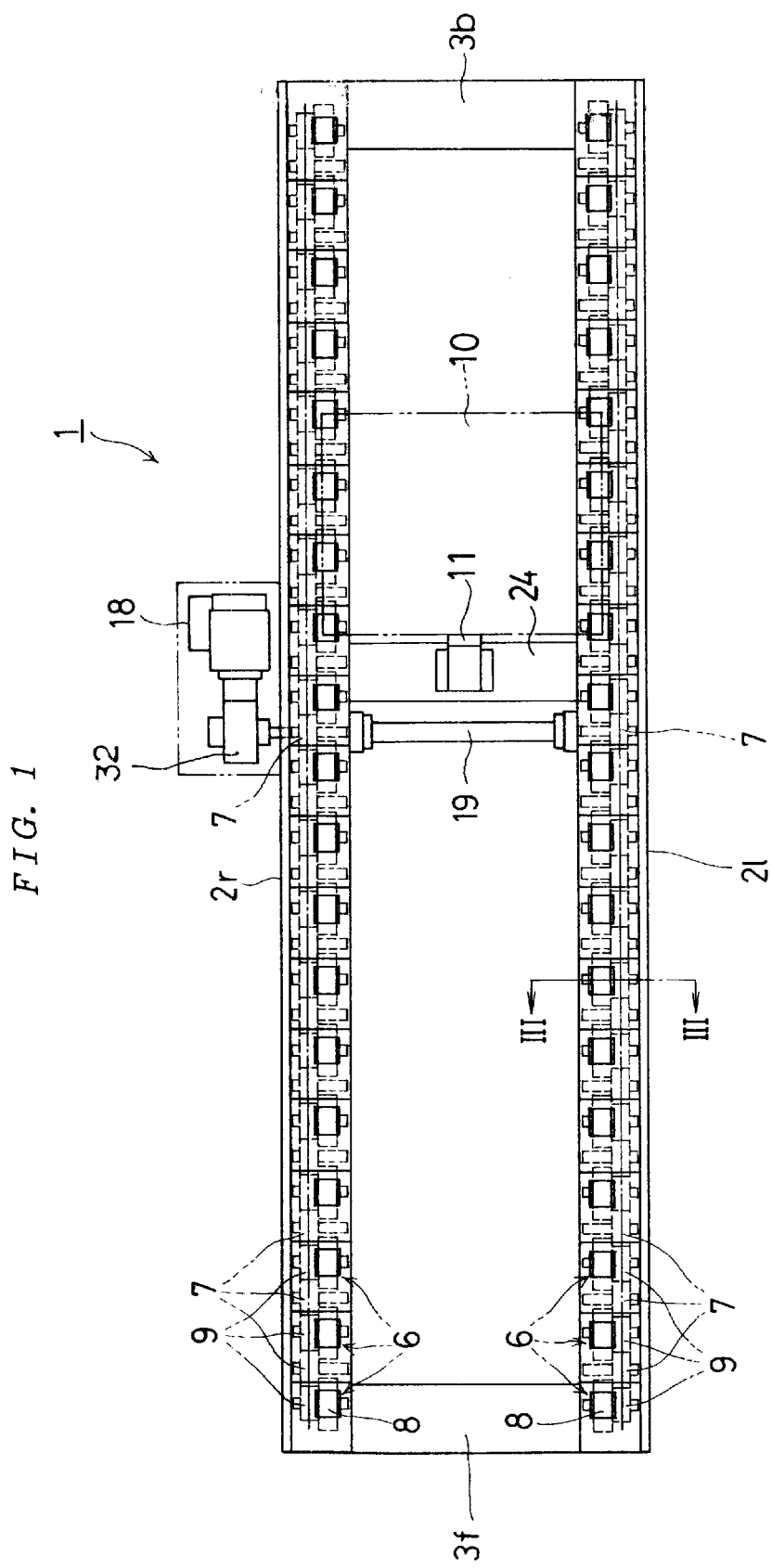
FIG. 1 is a plan view of a roller conveyer according to a first embodiment of the present invention.
Figure 2:
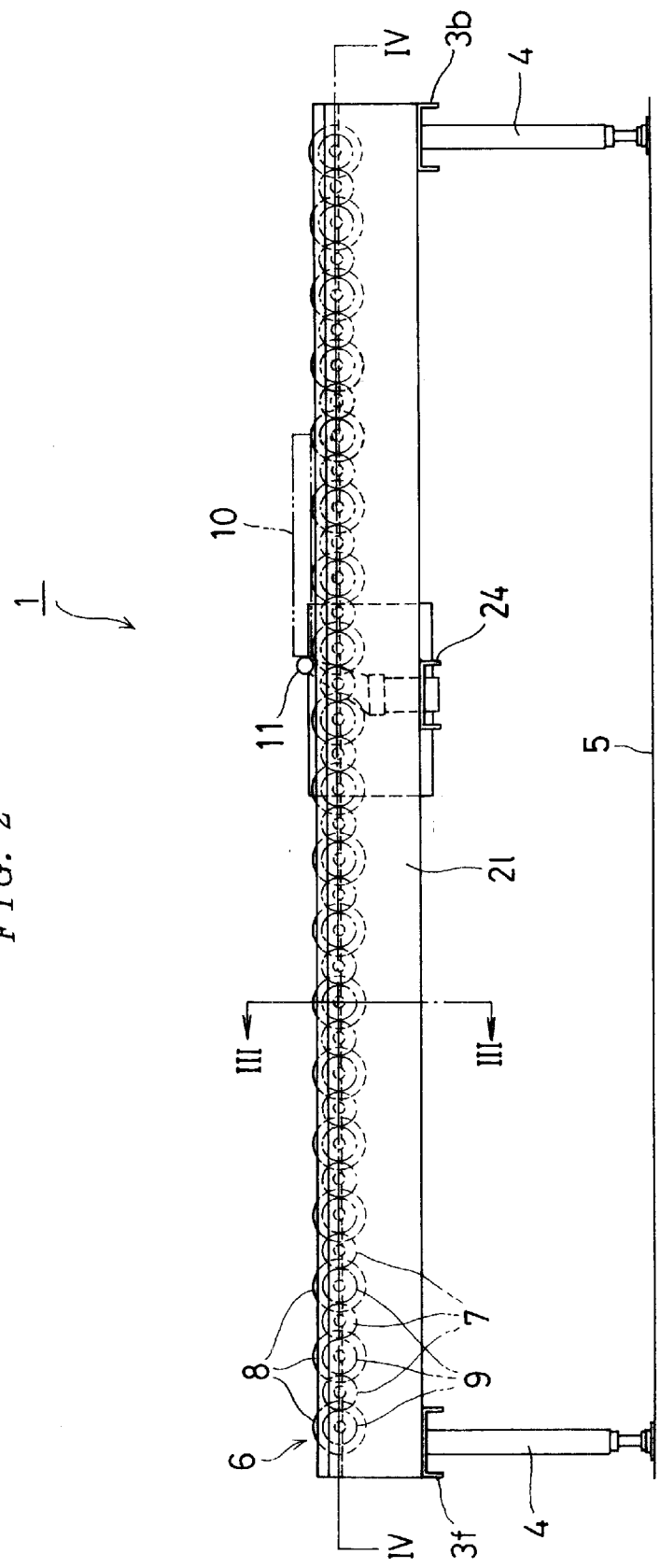
FIG. 2 is a side view of the roller conveyer of FIG. 1.

In FIGS. 1 and 2, a roller conveyer 1 according to the first embodiment includes right-hand and left-hand longitudinal frames 2r and 2l located right and left with respect to and extending in the direction of conveyance (to the left in FIGS. 1 and 2) and front and back lateral frames 3f and 3b located at front and back end portions of the longitudinal frames 2r and 2l (the term "front" refers to the direction of conveyance). The longitudinal frames 2r and 2l and the lateral frames 3f and 3b are integrated into a rectangular framework. This framework is disposed on a floor 5 while being supported by four supports 4-two front supports and two back supports. The lateral frames 3f and 3b are attached to the lower surfaces of the right-hand and left-hand longitudinal frames 2r and 2l in order to connect them together.

Figure 3:
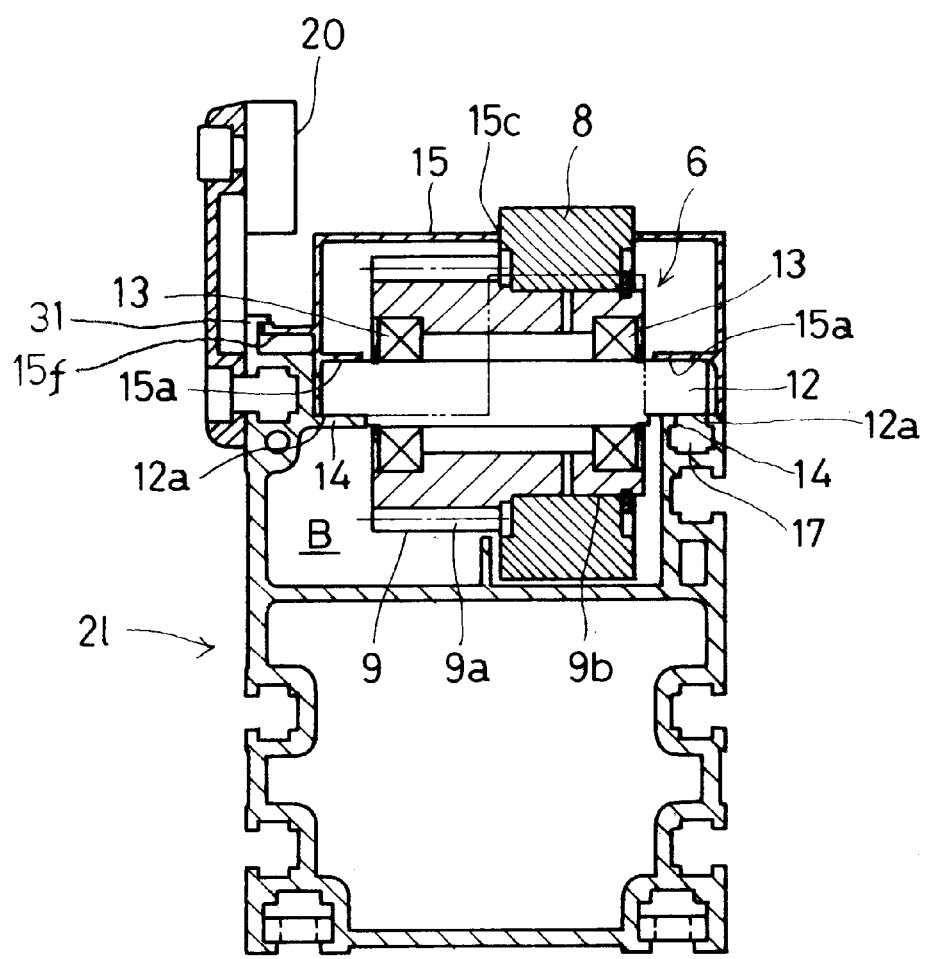
FIG. 3 is a sectional view taken along line III—III of FIG. 1 or 2.
Figure 4:
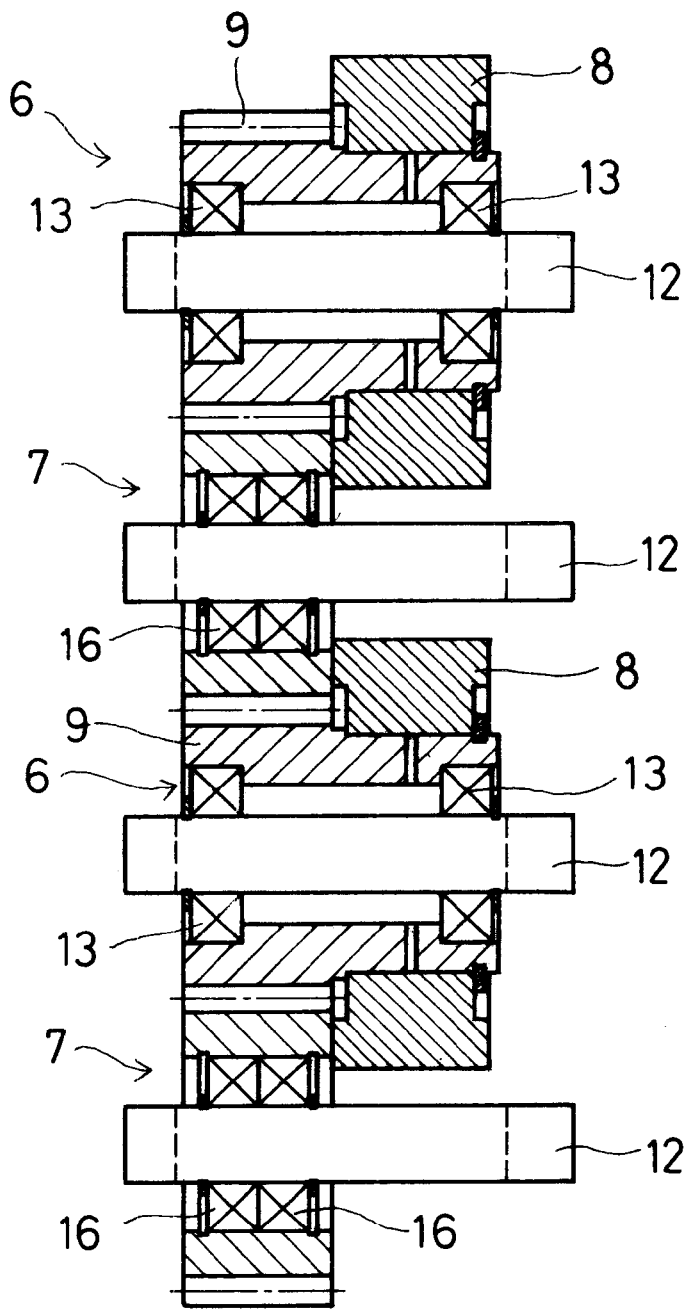
FIG. 4 is a portion of a sectional view taken along line IV—IV of FIG. 2.

FIG. 3 shows the cross-section of the left-hand longitudinal frame 2l (the cross-section of the longitudinal frame 2r has a mirror image of that of the left-hand longitudinal frame 2r). As shown in FIG. 3, this cross-section assumes substantially the shape of two rectangles placed on top of the other while the upper side of the upper rectangle is missing to thereby define an upper opening for a space B. The space B accommodates a column of rollers 6. As shown in FIGS. 1, 2, and 4, a gear (second gear) 7 is interposed between the two adjacent rollers 6 so as to interlockingly engage the same, thereby transmitting power from one roller 6 to the other roller 6.

Figure 6:
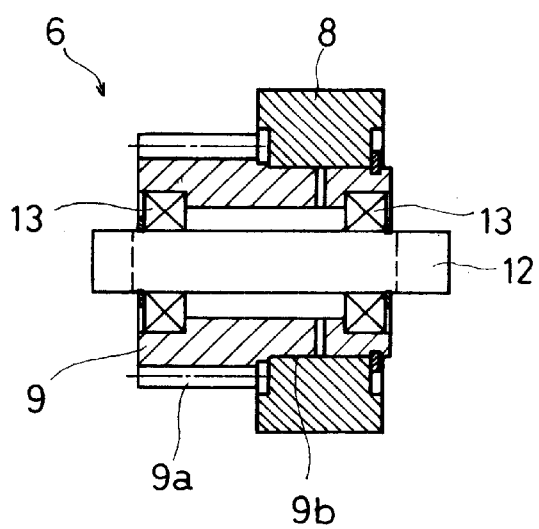
FIG. 6 is a longitudinal sectional view of a roller.

As shown in FIG. 6, the roller 6 includes a roller body 8 and a gear element (first gear) 9. Substantially the left half of the gear element 9 in FIG. 6 forms a gear portion 9a having gear teeth formed thereon. Substantially the right half of the gear element 9 forms a bearing portion 9b for supporting the roller body 8. The roller body 8 and the gear element 9 are assembled coaxially. The thus-assembled roller 6 is supported by a guide pin 12 in such a manner as to be rotatable about the same by means of right-hand and left-hand bearings 13.

The roller 6 is a friction roller. Specifically, rotation of the gear element 9 is frictionally transmitted to the roller body 8 via the bearing portion 9b. As will be described later, when a stopper 11 rises to stop an article 10 being conveyed on the rotating rollers 6, friction between the article 10 and the roller bodies 8 causes stoppage of rotation of the roller bodies 8. As a result, the gears 9 keep rotating while the roller bodies 8 slide on the corresponding bearing portions 9b. Thus, the articles 10 can be easily accumulated on the rollers 6. The gear portion 9b and the roller body 8 are made of material conventionally used for a friction roller conveyer.

Figure 5:
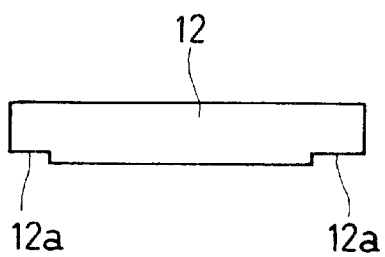
FIG. 5 is a front view of a guide pin.

As shown in FIGS. 3 and 5, portions of the circumferential surface of the guide pin 12 are cut off at opposite ends of the same, thereby forming planar portions 12a. As shown in FIG. 3, these planar portions 12a are placed on the corresponding flat, narrow elongated support surfaces of support portions 14 formed on the right-hand and left-hand walls of the left-hand longitudinal frame 2l which defines the space B. The roller 6 is thus supported by the left-hand longitudinal frame 2l.

A cover 15 for the roller 6 presses the guide pin 12 downward such that recesses 15a (see FIGS. 3 and 9) formed in bottom edge portions of the right-hand and left-hand walls of the cover 15 are fitted onto opposite end portions of the guide pin 12, thereby fixing the guide pin 12 in place on the longitudinal frame 2l. In this manner, the roller 6 is disposed at a predetermined position on the support portions 14 of the longitudinal frame 2l while being rotatably supported on the guide pin 12.

Figure 7:
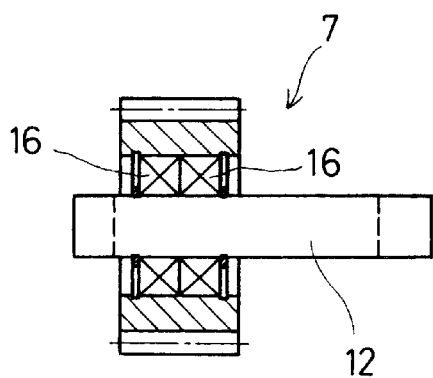
FIG. 7 is a longitudinal sectional view of a second gear.

As mentioned previously, the second gear 7 is interposed between the two adjacent rollers 6 so as to interlockingly engage the rollers 6. As shown in FIG. 7, this second gear 7 is also supported by a guide pin 12 in such a manner as to be rotatable about the same by means of right-hand and left-hand bearings 16. The second gear 7 is engaged with the gear element 9 of the roller 6.

The guide pin 12 for supporting the second gear 7 is fixedly placed on the support portions 14 of the longitudinal frame 2l as in the case of the roller 6. The cover 15 presses the guide pin 12 downward such that recesses 15b formed in bottom edge portions of the right-hand and left-hand walls of the cover 15 are fitted onto the opposite end portions of the guide pin 12, thereby fixing the guide pin 12 in place. In this manner, the second gear 7 is disposed at a predetermined position on the support portions 14 of the longitudinal frame 2l while being interposed between the two adjacent rollers 6 and being rotatably supported on the guide pin 12.

The cover 15 assumes the form of a rectangular box which is opened downward. As mentioned above, the cover 15 has the recesses 15a and 15b formed in the bottom edge portions of the right-hand and left-hand walls thereof. The cover has windows formed in a back wall and a top panel thereof so as to allow a portion of the roller body 8 to project therefrom. A portion of the roller body 8 projecting from a window 15c (see FIGS. 3 and 8) formed in the top panel of the cover 15 serves as a support portion for supporting the article 10 to be conveyed.

Figure 8:
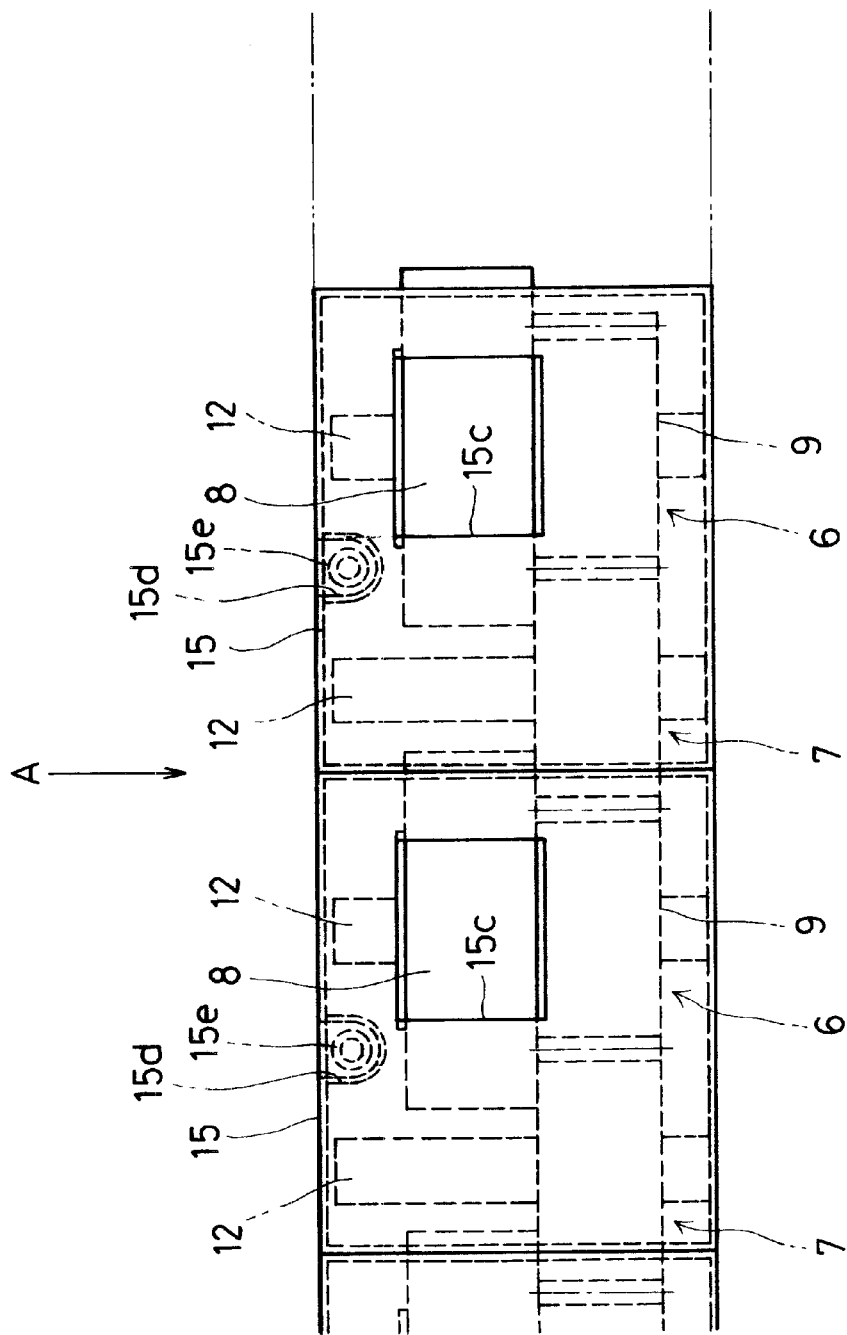
FIG. 8 is an enlarged partial view of the roller conveyer of FIG. 1.
Figure 9:
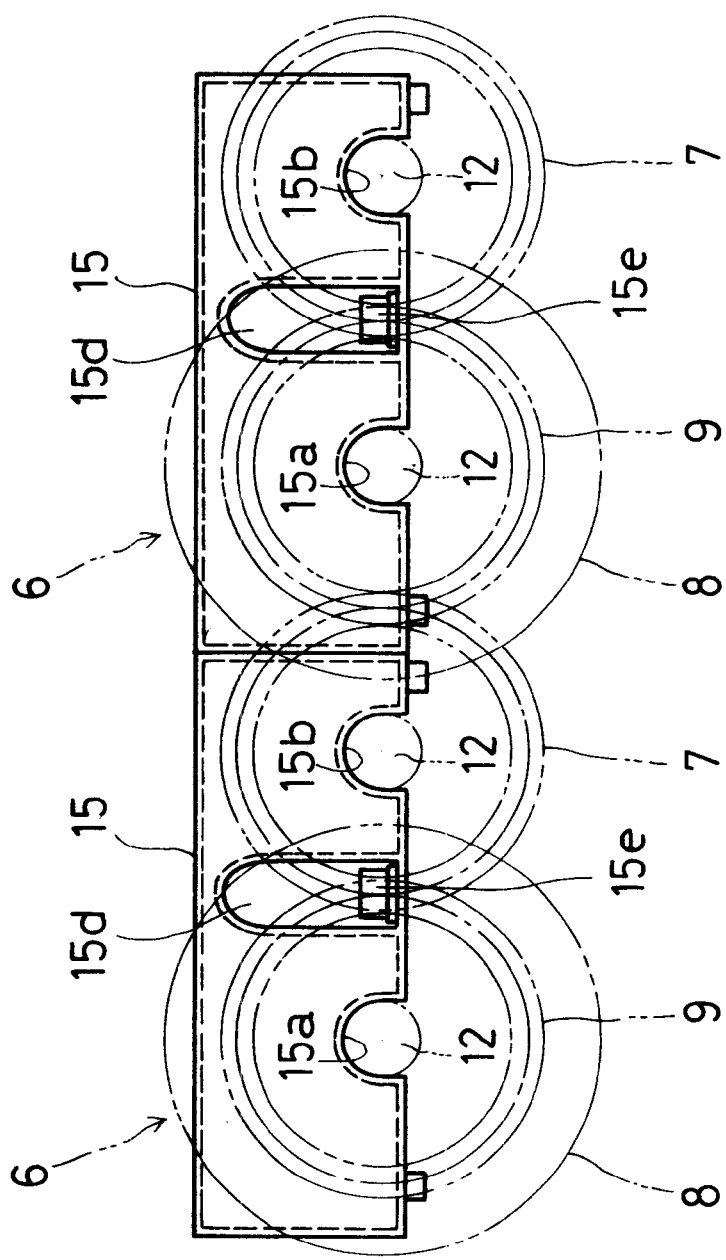
FIG. 9 is an inner side view as viewed from the direction of arrow A in FIG. 8 and is a right-hand side view of FIG. 3.

As shown in FIGS. 8 and 9, the right-hand wall of the cover 15 has a vertically elongated recess 15d formed inward and located between the recess 15a and the recess 15b. A boss 15e having a round hole formed therein is formed at a lower portion of the recess 15d. A stay bolt is inserted through the round hole in order to attach the cover 15 to the longitudinal frame 2l.

After being inserted through the round hole formed in the boss 15e, the stay bolt (not shown) is screw-engaged with a threaded hole formed in a long, narrow plate nut (not shown). The plate nut is inserted into a groove 17 (see FIG. 3) formed in the right-hand wall of the longitudinal frame 2l which defines the space B in cooperation with the left-hand wall. The groove 17 assumes a bottleneck cross-section, thereby preventing the plate nut from coming out upward from the groove 17. In this manner, the cover 15 is fixedly attached to the longitudinal frame 2l. Through change in the position of this stay bolt, the installation position of the cover 15 can be changed accordingly. The recess 15d provides work space for mounting/demounting the stay bolt.

The groove 17 assumes a long, narrow shape and has an opening formed at a flat support surface of the support portion 14 formed at the right-hand wall of the longitudinal frame 2l. The flat surface around the opening serves as a support surface, on which is placed the planar portion 12a of the guide pin 12 located at the inner-side end of the guide pin 12 (at the right-hand-end side of the guide pin 12 in FIG. 3).

As shown in FIG. 3, a protrusion 15f projects outward from a vertically central portion of the left-hand wall of the cover 15. The protrusion 15f is engaged with a hooked engagement portion 31 formed along the upper edge of the left-hand wall of the longitudinal frame 2l, thereby holding the cover 15 in place.

The manner in which the roller 6 and the second gear 7 are installed in place on the support portions 14 of the right-hand longitudinal frame 2r is similar to the above-described manner in which the roller 6 and the second gear 7 are installed in place on the support portions 14 of the left-hand longitudinal frame 2l. The roller 6 and the second gear 7 are installed symmetrically with respect to the centerline of the roller conveyer 1.

A column of interlockingly engaged rollers 6 and second gears 7 is accommodated in each of the spaces B of the right-hand and left-hand longitudinal frames 2r and 2l. Being placed on a plurality of rollers 6 accommodated in the space B of the left-hand longitudinal frame 2l and a plurality of rollers 6 accommodated in the space B of the right-hand longitudinal frame 2r, the article 10 is conveyed as the rollers 6 rotate.

Referring again to FIG. 1, a motor 18 is disposed at an intermediate position with respect to the direction of conveyance of the roller conveyer 1. The output shaft of a speed reducer 32 of the motor 18 is connected to the shaft of the second gear 7 so as to transmit torque to the rollers 6. Torque output from the motor 18 is indirectly input to the rollers 6 engaged with this second gear 7. The thus-input power is sequentially transmitted to the upstream and downstream rollers 6 through engagement between the second gear 7 and the first gear 9 of the roller 6. Although torque is transmitted in such sequential manner, the rollers 6 are rotated concurrently.

In the case of the roller conveyer 1 shown in FIG. 1, only a single motor 18 is disposed beside the right-hand longitudinal frame 2r. The second gear 7 of the right-hand longitudinal frame 2r to which power is input from the motor 18 is connected to the corresponding second gear 7 of the left-hand longitudinal frame 2l by means of a shaft 19 for transmission of power. However, another motor 18 may be disposed beside the left-hand longitudinal frame 2l so as to eliminate the shaft 19. In either case, the number of motors 18 is not particularly limited and a plurality of motors 18 may be used. Also, the output shaft of the speed reducer 32 of the motor 18 may be connected to the shaft of the first gear 9 of the roller 6 located at an intermediate position with respect to the longitudinal direction of the roller conveyer 1 so as to directly input power to this roller 6 from the motor 18.

Preferably, the motor 18 is disposed at an intermediate portion of the roller conveyer 1 with respect to the longitudinal direction (direction of conveyance) of the roller conveyer 1; i.e., at a portion of the roller conveyer 1 excluding opposite end portions of the same. As a result, the rotational load accumulated in the second gears 7 and the first gears 9 of the rollers 6 located in the vicinity of the motor 18 is decreased, thereby improving efficiency in transmission of conveyance power.

As shown in FIGS. 1 and 2, the stopper 11 is disposed at an appropriate position of the roller conveyer 1 with respect to the longitudinal direction of the same in such a manner as to be able to project above the conveyance path surface. The stopper 11 is supported by a plate 24 extending between the right-hand and left-hand longitudinal frames 2r and 2l.

When the stopper 11 projects above the conveyance path surface, movement of the article 10 is blocked. As a result, sliding friction between the article 10 and the roller bodies 8 of the rollers 6 causes the roller bodies 8 to stop rotating. However, as mentioned previously, the rollers 6 are friction rollers and, thus, the gear elements 9 of the rollers 6 keep rotating. When the stopper 11 is retracted, the rollers 6 resume regular rotation, so that movement of the article 10 is also resumed. While movement of the article 10 is suspended, the article 10 can undergo predetermined operations. In FIG. 3, reference numeral 20 denotes a sensor for detecting the article 10.

Figure 10A:
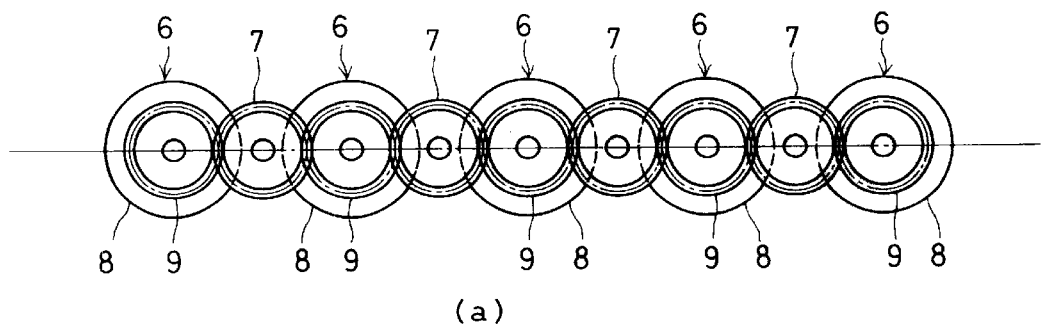
FIGS. 10A to 10C are diagrams illustrating different roller pitches.
Figure 10B:
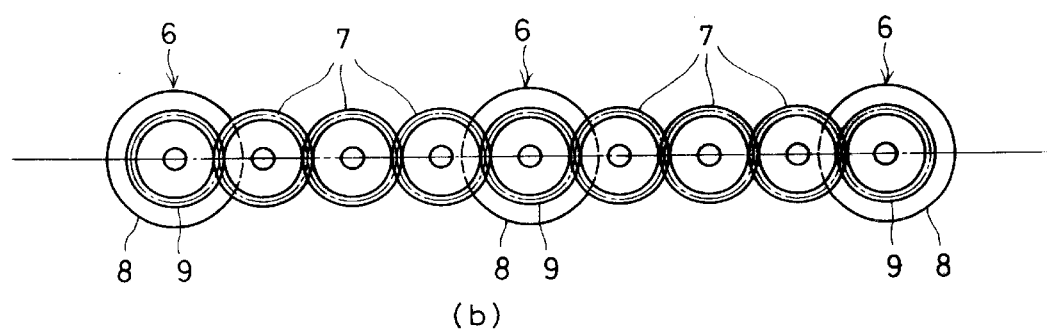
Figure 10C:
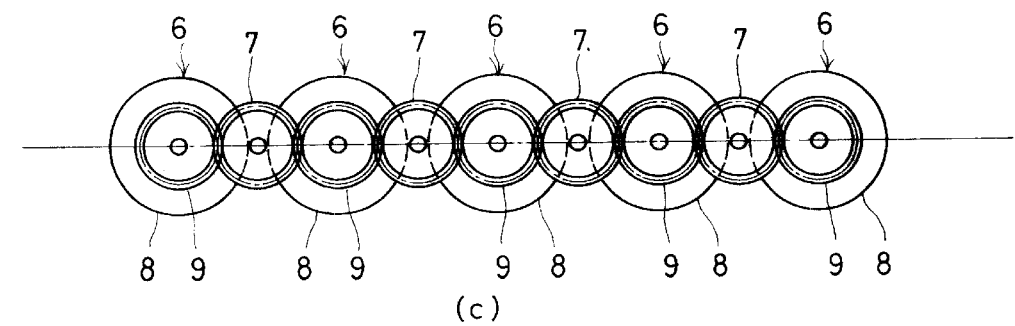

To change the spacing between the two adjacent rollers 6 (roller pitch), the number of second gears 7 interposed between the two adjacent rollers 6 may be increased or decreased (FIG. 10B), the diameter of the second gear 7 may be changed (FIG. 10C), or the diameter of the first gear 9 of the roller 6 may be changed (not shown). Notably, FIG. 10A shows an interlockingly engaged array of the rollers 6 and the second gears 7 before the roller pitch is changed. Thus, the specifications of the roller conveyer 1 can be flexibly modified according to the size of the article 10 to be conveyed.

The roller conveyer 1 of the first embodiment having the above-described structure yields the following effects.

The roller conveyer 1 is adapted to convey the article 10 placed on the conveyance path through rotation of a plurality of rollers 6 disposed at opposite sides of the conveyance path. Each of the rollers 6 includes the roller body 8 and the first gear 9. The roller body 8 and the first gear 9 are assembled coaxially such that relative sliding rotation therebetween is permitted. One or more second gears 7 are interposed between the adjacent first gears 9 to thereby interlockingly engage the corresponding rollers 6, so that all the rollers 6 can be rotated concurrently. Torque output from the motor 18 is input directly or indirectly to any one of the first gears 9.

As a result, the output shaft of the motor 18 (the output shaft of the speed reducer 32), the shaft of the first gear 9, and the shaft of the second gear 7 can be disposed on the common conveyance path surface while being oriented in the same direction perpendicular to the direction of conveyance. Thus, the rotation transmission mechanism can be a simplified and compact structure, thereby reducing the cost of manufacture of the conveyer. Since the gears are engaged such that the shafts thereof are oriented in the same direction, efficiency in transmission of torque is higher than that of a conventional shaft-driven roller conveyer using bevel gears. Additionally, since the conveyer of the first embodiment does not use bevel gears, which are expensive, the cost of manufacture thereof can be further reduced even though the number of gears used is equal to that in a conventional counterpart.

The adjacent first gears 9 are interlockingly engaged by means of one or more second gears 7 interposed therebetween so that all the first gears 9 can be rotated concurrently. The motor 18 is connected directly or indirectly to any one or more of the first gears 9, thereby causing all the rollers 6 to effect a conveying operation. In order to increase conveyance power, a plurality of motors 18 may be connected to a plurality of any first gears 9. That is, the number of motors 18 and the first gears 9 to which the motors are to be connected is not particularly limited. Also, the roller pitch can be modified freely through increase/decrease in the number of the second gears 7 interposed between the adjacent first gears 9 or through change in diameter of the first and second gears 9 and 7. Thus, the specifications of the roller conveyer 1 can be flexibly modified.

Because the motor drive unit need not necessarily be disposed at the upstream or downstream end of the roller conveyer 1, but may be disposed at an intermediate portion of a conveyance path section, there is no need to reserve space for the motor drive unit or a tail unit, in addition to space for the conveyance path section, thereby economizing on space.

As a result of the motor drive unit being disposed at an intermediate portion of the conveyance path section, the load accumulated in the first and second gears 9 and 7 located in the vicinity of the motor 18 is decreased, thereby improving efficiency in transmission of conveyance power. Since the durability of the first and second gears 9 and 7 is improved, the strength of gear material can be decreased accordingly, thereby reducing cost of manufacture of the roller conveyer 1.

The rollers 6 are of a free-flow type, which permits accumulation of the articles 10 upon forced blockage of movement of the articles 10, without stopping rotation of the gear elements (first gears) 9 of the corresponding rollers 6. Thus, even when a very heavy article 10 is to be conveyed, a sudden start of the roller conveyer 1 does not impose an excessive load on the motor 18, and the motor 18 can sufficiently endure a rotative load accumulated in a number of first and second gears 9 and 7. Therefore, the roller conveyer 1 does not require a large-capacity motor, thereby further reducing cost of manufacture and operation.

Furthermore, the roller conveyer 1 of the first embodiment does require adjustment of chain tension, which becomes necessary for a conventional chain-driven roller conveyer after long-term use thereof, thereby facilitating maintenance.

A second embodiment of the present invention will next be described with reference to FIG. 11.

The roller conveyer 1 of the second embodiment differs from that of the first embodiment in the structure of the roller 6, the structure of the right-hand and left-hand longitudinal frames 2r and 2l, and the support structure for the roller 6.

Specifically, according to the first embodiment, the roller 6 includes the roller body 8 and the gear element (first gear) 9. The thus-assembled roller 6 is supported from inside by the guide pin 12 in such a manner as to be rotatable about the same by means of the right-hand and left-hand bearings 13. The guide pin 12 is fixedly placed on the support portions of the right-hand and left-hand walls, which define the space B, of the left-hand longitudinal frame 2l (right-hand longitudinal frame 2r). In such manner, the rollers 6 are supported by the left-hand longitudinal frame 2l and by the right-hand longitudinal frame 2r. According to the second embodiment, the roller 6 includes the roller body 8 and the gear element (first gear) 9. The thus-assembled roller 6 is supported from outside the gear element 9 by a guide sleeve 21 in such a manner as to be rotatable within the same by means of the right-hand and left-hand bearings 13. This guide sleeve 21 is fixedly fitted into a bearing hole 22 formed in an inner wall (facing the interior of the roller conveyer 1) 33, which defines the space B in cooperation with the other wall, of the left-hand longitudinal frame 2l (right-hand longitudinal frame 2r). In such manner, the rollers 6 are supported by the left-hand longitudinal frame 2l and by the right-hand longitudinal frame 2r.

As described above, since the guide sleeve 21 is fixedly fitted into the bearing hole 22 formed in the inner wall 33 of the left-hand longitudinal frame 2l or the right-hand longitudinal frame 2r to thereby support the roller 6 by the left-hand longitudinal frame 2l or the right-hand longitudinal frame 2r, the inner wall 33 is formed sufficiently thick to endure a load imposed on the roller 6. An outer wall 34 of the left-hand longitudinal frame 2l or the right-hand longitudinal frame 2r is attached to the inner wall 33, thereby defining the space B in cooperation with the inner wall 33. The outer wall 34 covers a narrow, long recess formed on the outer surface of the inner wall 33 and extending in the longitudinal direction of the inner wall 33, thereby defining the space B. In order to reduce the weight of the inner wall 33, a cavity may be formed within the inner wall 33 so long as rigidity thereof is not impaired.

Since the roller 6 is configured and supported as described above, the roller body 8 of the roller 6 projects toward the center of the roller conveyer 1 from the left-hand longitudinal frame 2l or the right-hand longitudinal frame 2r. The space B accommodates a column of interlockingly engaged first gears 9 and second gears 7, each interposed between the two adjacent first gears 9. The second embodiment does not have the cover 15 of the first embodiment.

The second embodiment differs from the first embodiment in the above-described features. Other features are basically similar to those of the first embodiment, and thus description is omitted.

Figure 11:
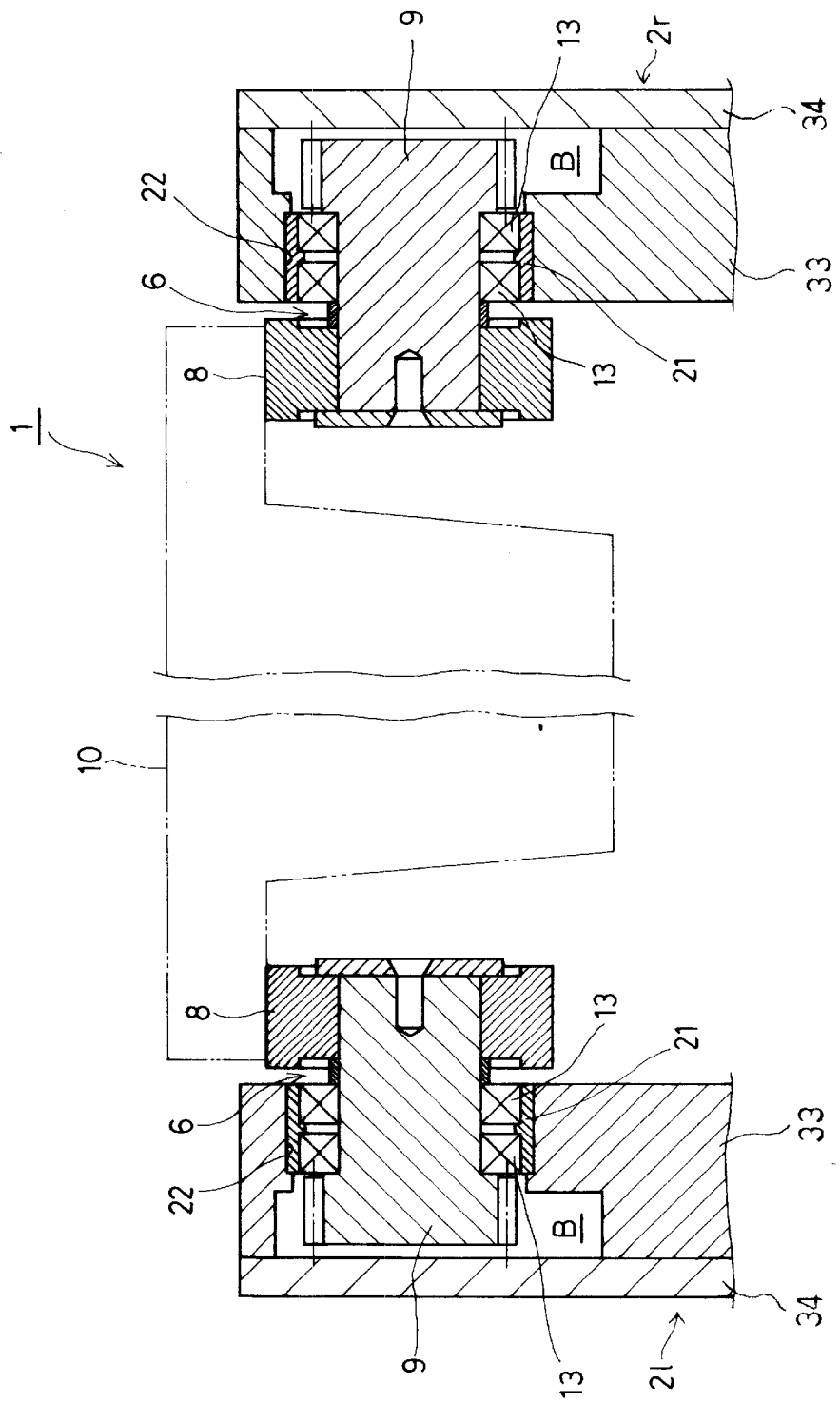
FIG. 11 is a transverse sectional view of a roller conveyer according to a second embodiment of the present invention.

The roller conveyer 1 of the second embodiment having the above-described structure is suited for conveying an article 10 having a cross-section as shown in FIG. 11. Specifically, an upper portion of the cross-section of article 10 has right-hand and left-hand side projections, and a central portion of the same extends downward. The side projections may extend over a short or long length in the direction of conveyance.

Since the second embodiment does not use the guide pin 12, the structure of the roller 6, the structure of the right-hand and left-hand longitudinal frames 2r and 2l, and the support structure for the roller 6 are simplified accordingly. Also, the second embodiment offers advantages similar to those yielded by the first embodiment.

A third embodiment of the present invention will next be described with reference to FIG. 12.

Figure 12:
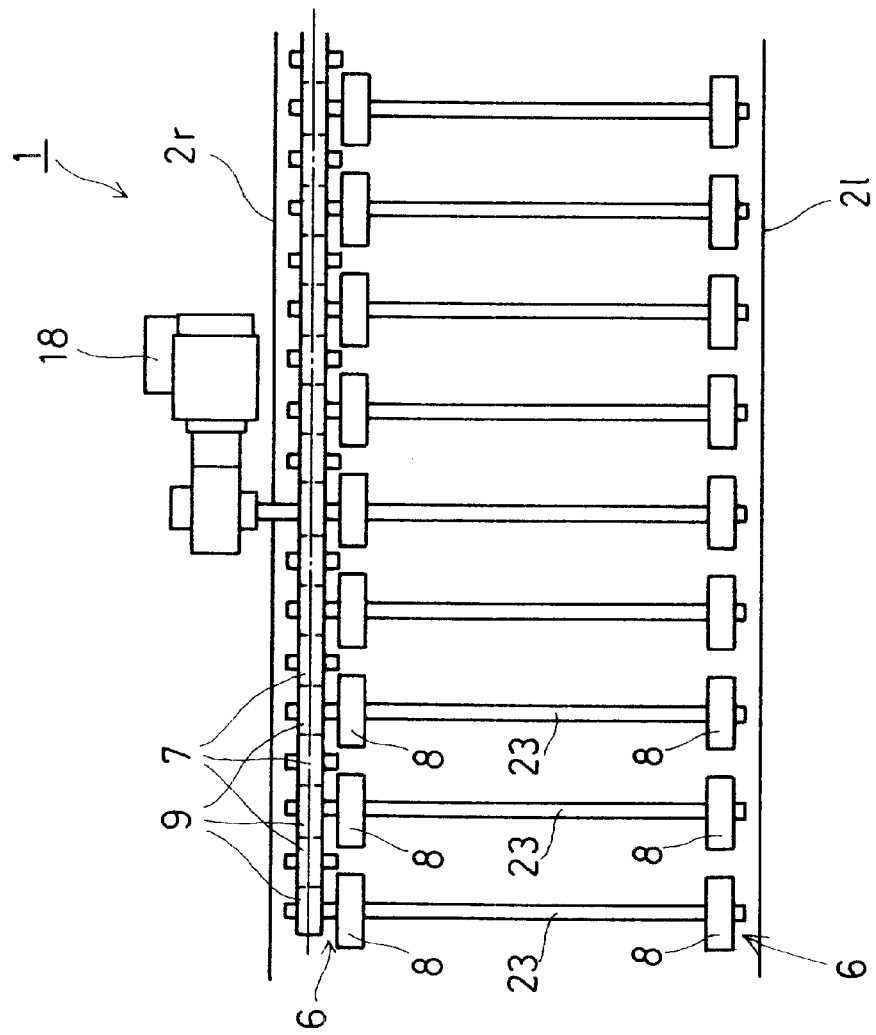
FIG. 12 is a schematic partial plan view of a roller conveyer according to a third embodiment of the present invention.

The roller conveyer 1 of the third embodiment differs from that of the first embodiment in that interlocking engagement of the first gears 9 and the second gears 7 is eliminated at one side of the conveyance path in FIG. 12, i.e., at the left side of the conveyance path with respect to the direction of conveyance.

The rollers 6 disposed at one side of the conveyance path are connected to the corresponding rollers 6 disposed at the other side of the same by means of the corresponding shafts 23. The shafts 23 are adapted to transmit torque to the rollers 6 arranged at the side of the conveyance path where the interlocking engagement mechanism is eliminated.

Through elimination of the interlocking engagement at one side of the conveyance path, the rotation transmission mechanism is further simplified and rendered compact, thereby reducing the cost of manufacture of the conveyer further. Also, the third embodiment provides advantages similar to those yielded by the first embodiment.

Figure 13:
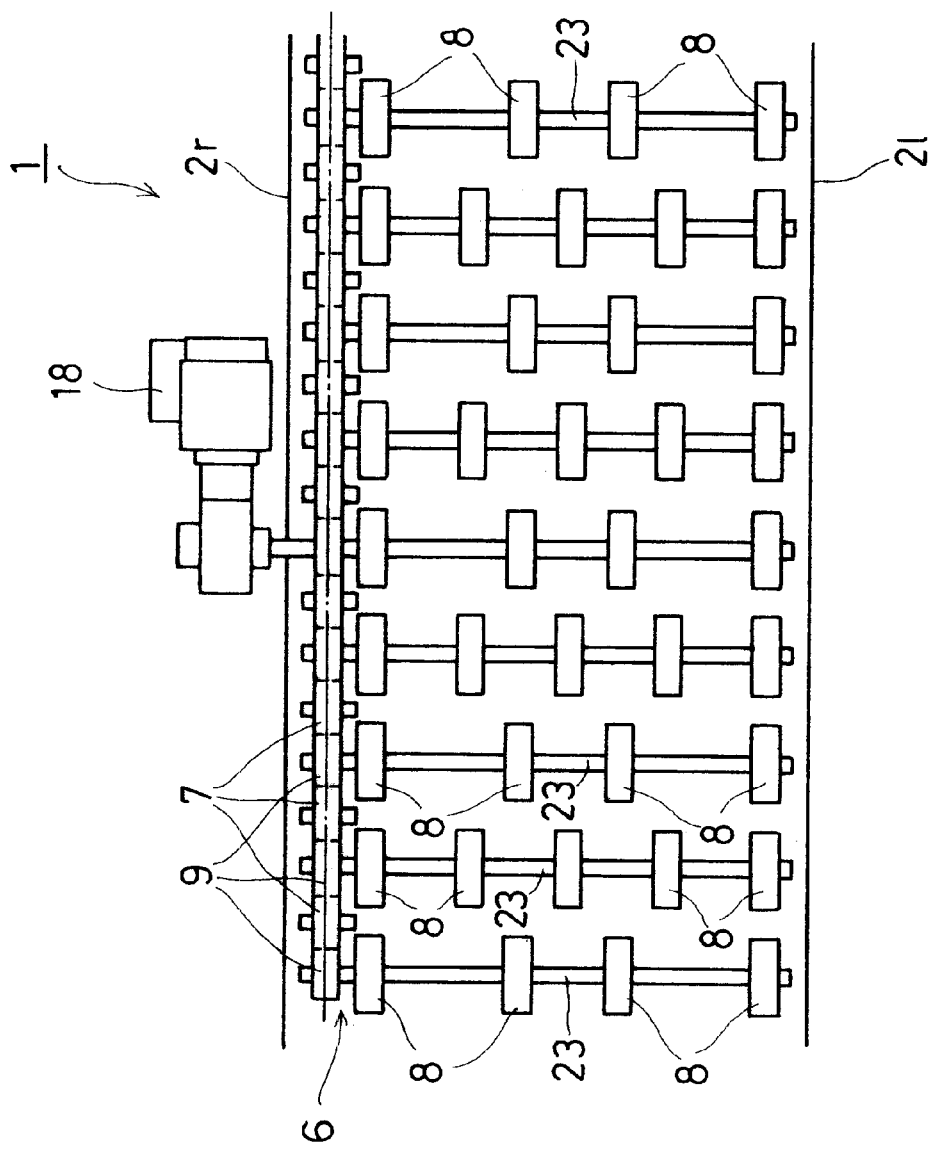
FIG. 13 is a schematic partial plan view of a roller conveyer according to a fourth embodiment of the present invention.

A fourth embodiment of the present invention will next be described with reference to FIG. 13. The fourth embodiment is a modification of the third embodiment.

According to the fourth embodiment, a plurality of (for example, 2 or 3) extra roller bodies 8 are fixedly attached to each of the shafts 23, thereby enabling conveyance of the article 10 of any size not greater than the width of the conveyance path. Thus, the fourth embodiment provides advantages substantially similar to those yielded by a ninth embodiment (which will be described later) and by the third embodiment.

Figure 14:
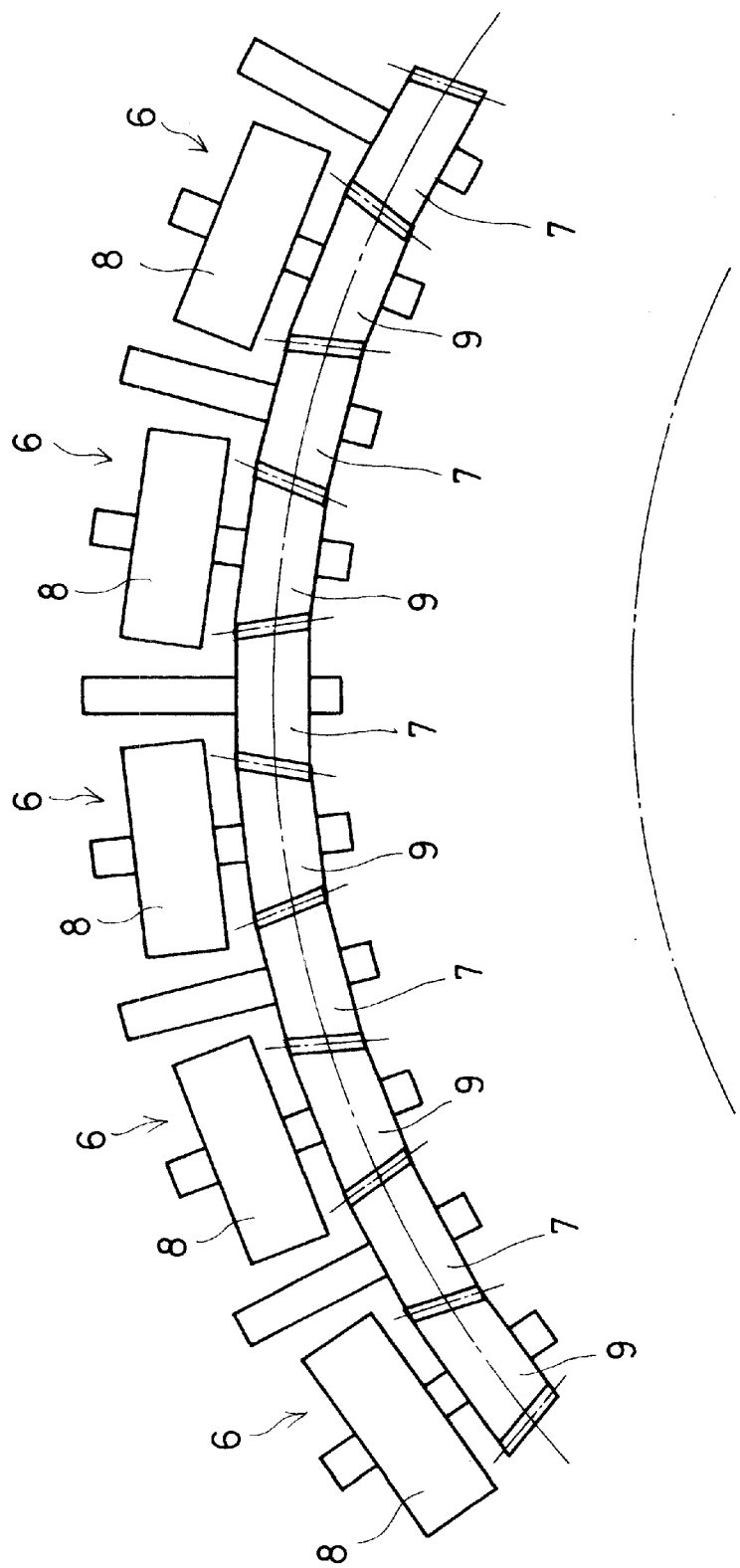
FIG. 14 is a schematic plan view of the interlocking engagement mechanism of rollers and second gears in a roller conveyer according to a fifth embodiment of the present invention.
Figure 15:
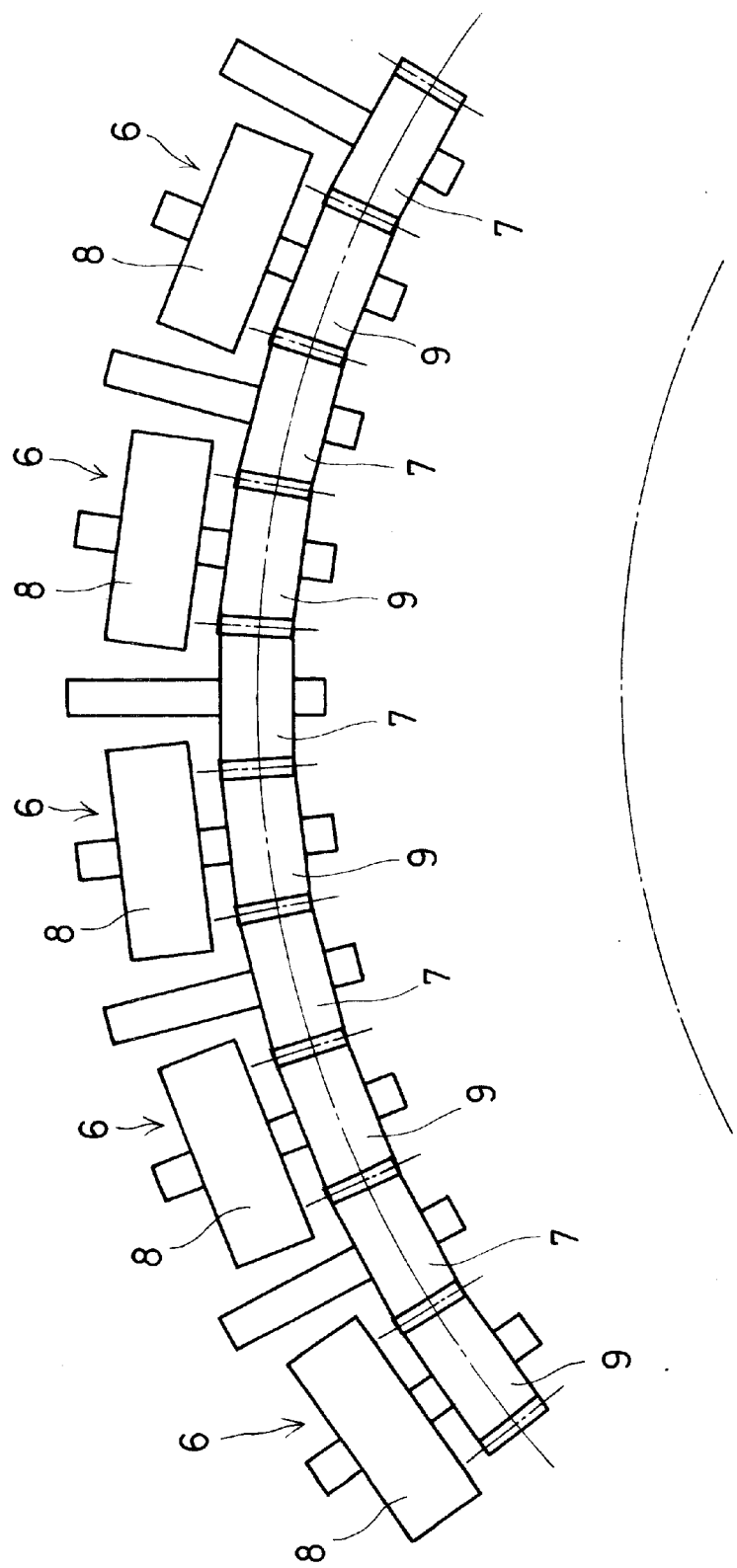
FIG. 15 is a schematic plan view showing a modification of the interlocking engagement of FIG. 14.

A fifth embodiment of the present invention will next be described with reference to FIGS. 14 and 15.

The roller conveyer 1 of the fifth embodiment differs from that of the first embodiment in that the conveyance path is curved horizontally.

According to the fifth embodiment, in order to provide a curved conveyance path, at least either the first gear 9 or the second gear 7 each have a diameter which varies in the direction of a rotational axis (hereinafter referred to as a varying diameter). In one such embodiment shown in FIG. 14, both of the first gear 9 and the second gear 7 have varying diameters in opposing directions. In another version of the fifth embodiment shown in FIG. 15, both the first gear 9 and the second gear 7 have varying diameters to a smaller extent than in FIG. 14. Notably, the diameter of the roller body 8 may be reduced toward the center of the curve.

According to the fifth embodiment, a curved conveyer can be manufactured easily. Furthermore, through modification of the degree of variance of the gear diameter, the curvature of a curved conveyer can be modified easily, so that a curved conveyer having a desired curvature can be manufactured easily. Also, the fifth embodiment provides advantages similar to those yielded by the first embodiment.

Figure 16:
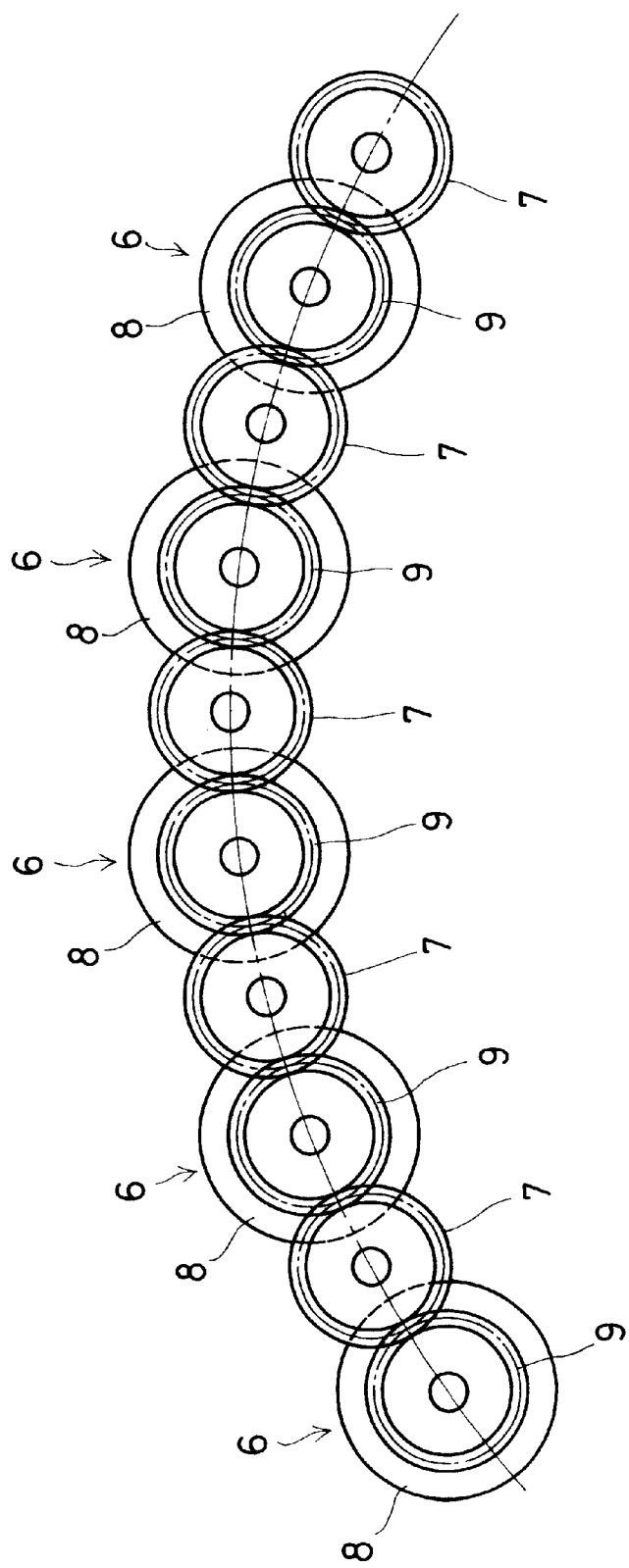
FIG. 16 is a schematic side view of an interlocking engagement mechanism of rollers and second gears in a roller conveyer according to a sixth embodiment of the present invention.

A sixth embodiment of the present invention will next be described with reference to FIG. 16.

The roller conveyer 1 of the sixth embodiment differs from the first embodiment in that the conveyance path surface is curved vertically.

According to the sixth embodiment, a plurality of rollers 6 are gradually and sequentially varied in the height of their rotational axes above a common horizontal plane along the direction of conveyance of the conveyance path. The second gears 7, each interposed between the two adjacent rollers 6, are also gradually and sequentially varied in height of their rotational axes above the common horizontal plane along the direction of conveyance of the conveyance path.

According to the sixth embodiment, an up-and-down conveyer suited for conveying cloth products, such as cloth bags, can be manufactured easily. Through modification of the degree of ascent or descent or through employment of various combinations of ascent and descent, the shape of the conveyance path surface can be designed freely. Also, the sixth embodiment provides advantages similar to those yielded by the first embodiment.

Figure 17:
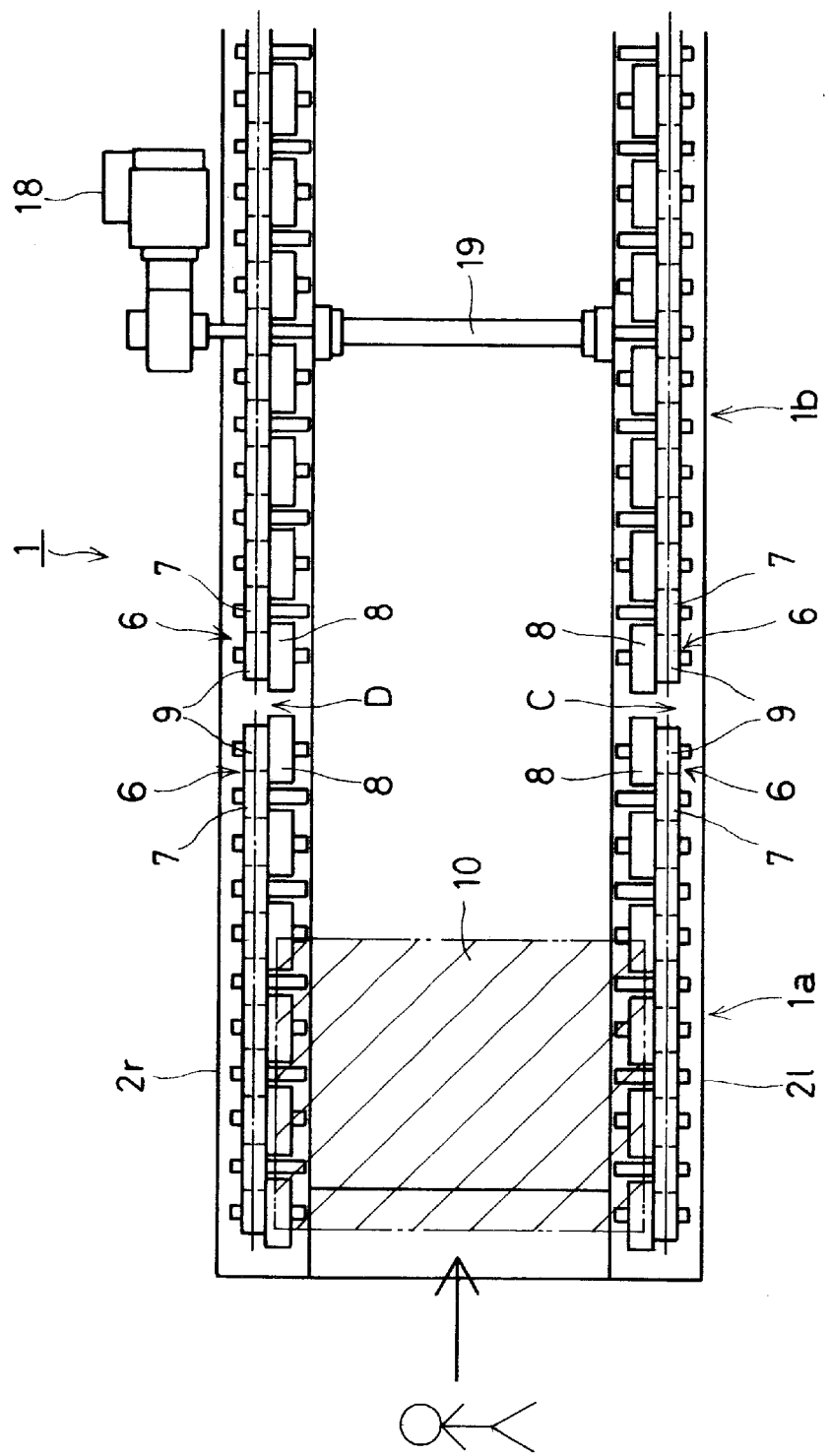
FIG. 17 is a schematic plan view of a roller conveyer according to a seventh embodiment of the present invention.
Figure 18:
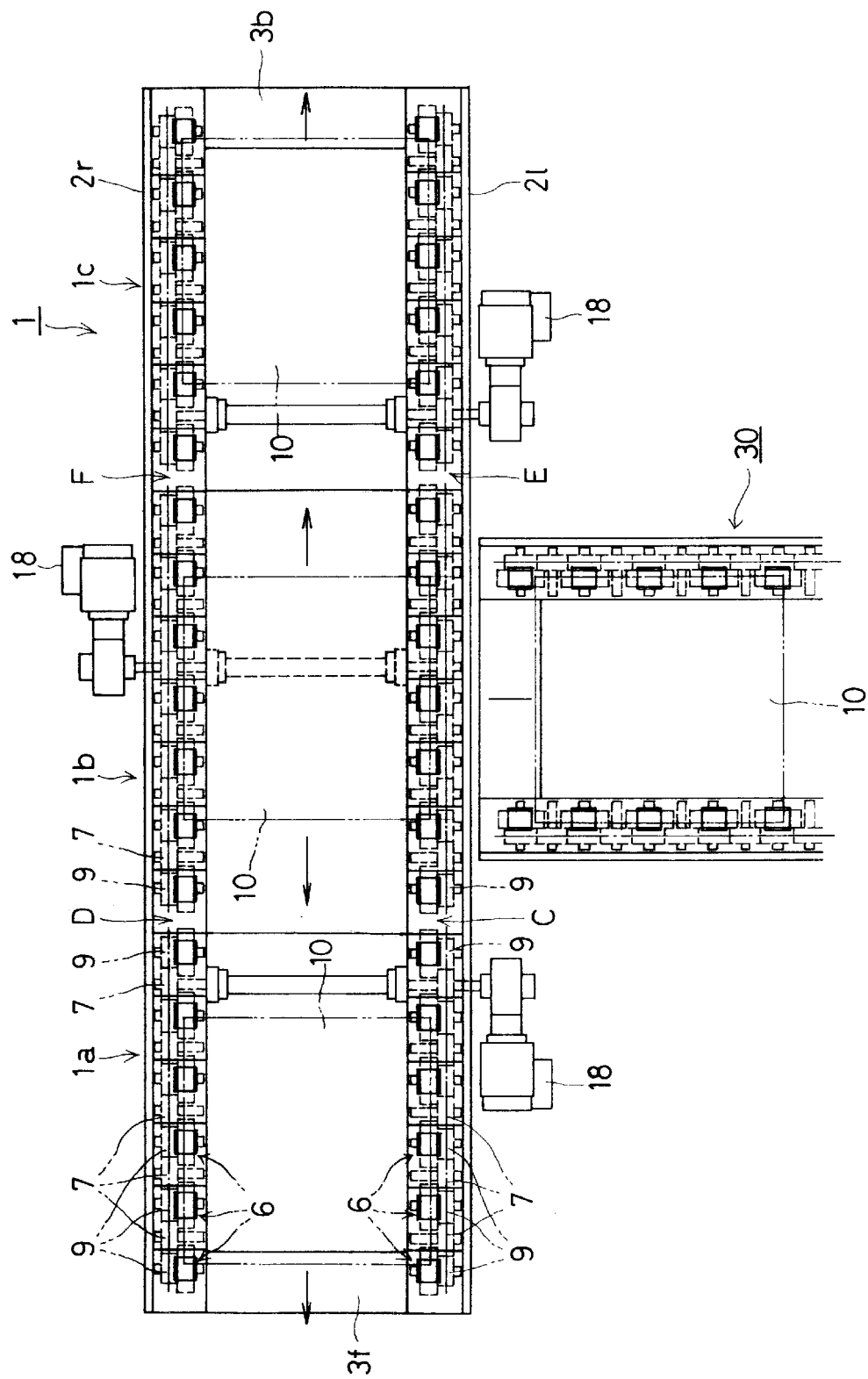
FIG. 18 is a plan view of a roller conveyer according to an eighth embodiment of the present invention, which is a modification of the embodiment of FIG. 17.

A seventh embodiment of the present invention will next be described with reference to FIGS. 17 and 18.

The roller conveyer 1 of the seventh embodiment is divided into a plurality of conveyer sections 1a, 1b, etc. along the direction of conveyance of the conveyance path. The engagement between adjacent first gears 9 is broken at the boundary between the adjacent conveyer sections 1a and 1b and 1c, etc. (denoted by letters C and D in FIG. 17 and by letters C to F in FIG. 18). At least one conveyer section equipped with the motor 18 (in FIG. 18, conveyer section 1b) can change the direction of conveyance.

The seventh embodiment differs from the first embodiment in the above-described features. Other features are basically similar to those of the first embodiment, and thus description is omitted.

Thus, each of the conveyer sections 1a, 1b, etc. can assume various forms of structure and operation. For example, the conveyer sections 1a, 1b, etc. can be motor-driven or manually driven (conveyer section 1a in FIG. 17); a certain conveyer section may be stopped while other conveyer sections are in operation; and one or more motor-driven conveyer sections can change the direction of conveyance (conveyer section 1b in FIG. 18). Thus, a single roller conveyer 1 can provide various selectable forms of conveyance. In other words, a single roller conveyer 1 can provide the functions of a plurality of different roller conveyers. Also, the seventh embodiment provides advantages similar to those yielded by the first embodiment.

An eighth embodiment of the present invention will next be described with reference to FIG. 18.

The roller conveyer 1 of the eighth embodiment differs from that of the seventh embodiment in that another conveyer 30 is disposed in the vicinity of the conveyer section 1b, which is capable of changing the direction of conveyance, such that an article 10 can be transferred onto the conveyer section 1b from a direction perpendicular to the direction of conveyance of the conveyer section 1b.

Thus, it becomes possible to provide a conveyer facility in which the direction of conveyance of each article can be changed between two opposite directions of conveyance perpendicular to the initial direction of conveyance. Also, the eighth embodiment provides advantages similar to those yielded by the seventh embodiment.

Figure 19:
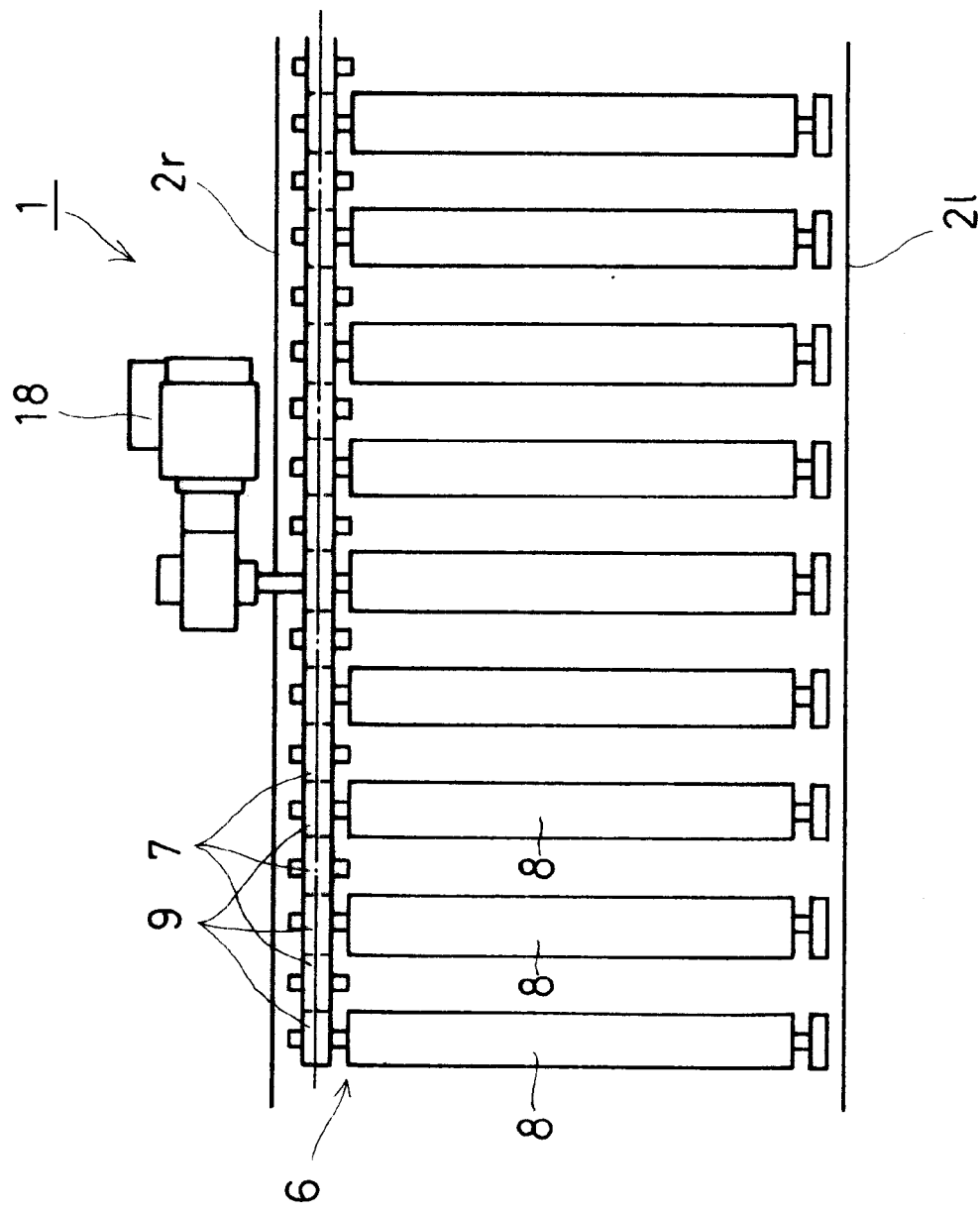
FIG. 19 is a schematic plan view of a roller conveyer according to a ninth embodiment of the present invention.
Figure 20:
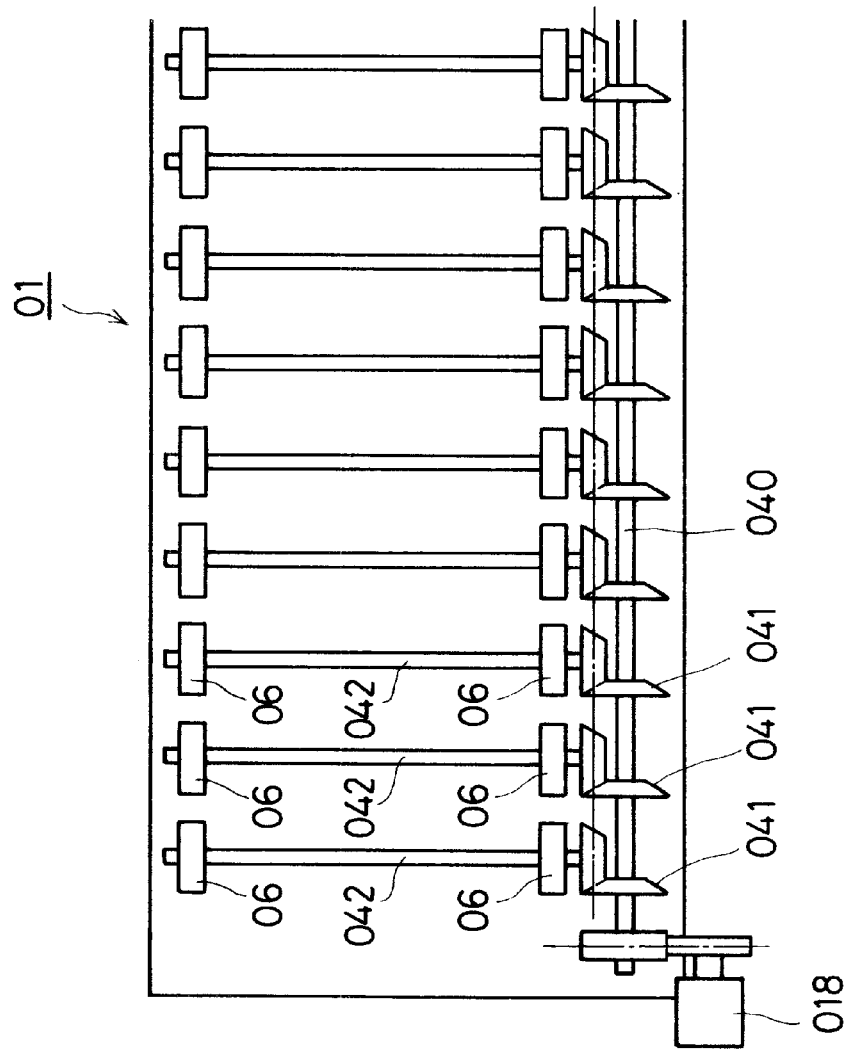
FIG. 20 is a schematic plan view of a conventional roller conveyer.

A ninth embodiment of the present invention will next be described with reference to FIG. 19.

The roller conveyer 1 of the ninth embodiment differs from that of the third embodiment (see FIG. 12) in that the roller body 8 extends substantially across the width of the conveyance path.

Thus, this roller conveyer 1 can convey an article 10 of any size not greater than the width of the conveyance path. Also, the ninth embodiment provides advantages similar to those yielded by the third embodiment.

According to the ninth embodiment, interlocking engagement mechanism of the first gears 9 and the second gears 7 is eliminated at the left-hand side of the conveyance path with respect to the direction of conveyance. However, the present invention is not limited thereto. The interlocking engagement mechanism may also be provided at the left-hand side of the conveyance path. In this case, it is preferable that a motor 18 also be disposed at the left-hand side of the conveyance path in order to drive the interlocked gears, thereby reducing a load imposed on the motor 18 disposed on the other side of the conveyance path with a resultant improvement in conveyance capability.

The above first through ninth embodiments are described in the context of rollers 6 of a free-flow type, which permits accumulation of the articles 10 upon forced blockage of movement of the articles 10, without stopping rotation of the gear elements (first gears) 9 of the corresponding rollers 6. However, the present invention is not limited thereto, but may employ rollers 6 of a non-free-flow type, in which rotation of the gear elements 9 of the corresponding rollers 6 is stopped upon forced blockage of movement of the articles 10.

Obviously, numerous modifications and variations of the present invention are possible in light of the above teachings. It is therefore to be understood that within the scope of the appended claims, the present invention may be practiced otherwise than as specifically described herein.

What is claimed is:

1. A roller conveyer adapted to convey articles on and along a conveyance path, comprising:

at least one motor; and a plurality of rollers disposed at least at both opposing lateral sides of the conveyance path and adapted to convey articles on and along the conveyance path through rotation thereof;

said rollers each comprising a roller body and a first gear attached coaxially to said roller body, said roller body and said first gear rotating with slipping therebetween permitted, wherein adjacent first gears on both of said lateral sides are interlockingly engaged to thereby rotatably drive the coaxially attached rollers concurrently;

at least one second gear interposed between and interlocking adjacent said first gears;

means for transferring torque of the motor, directly or indirectly, to any one of said gears disposed on one of said lateral sides; and at least one shaft, said one gear being mounted at one end of said shaft for rotation therewith and another gear being mounted on an end of said shaft opposite said one end, at a second of said lateral sides opposite said one lateral side for rotation with said shaft, whereby torque from the motor is transferred to said one gear, from said one gear to first gears interlocked therewith and to said shaft, from said shaft to said another gear, and from said another gear to first gears interlocked therewith.

2. A roller conveyer as described in claim 1, wherein said roller conveyer is divided into a plurality of conveyer sections along the direction of conveyance of the conveyance path, and engagement between adjacent first gears is broken at a boundary between adjacent conveyer sections; and wherein at least one conveyer section equipped with said motor can change the direction of conveyance.

3. A roller conveyer as described in claim 1, wherein at least either said first gears or said second gears each have a diameter which varies in the direction of a rotational axis such that the conveyance path is curved.

4. A roller conveyer as described in claim 1, wherein a plurality of said rollers are gradually and sequentially varied in height of rotation axis above a common horizontal plane along a direction of conveyance of the conveyance path so as to vertically curve a surface of the conveyance path.

5. A roller conveyer as described in claim 2, wherein a plurality of said rollers are gradually and sequentially varied in height of rotation axis above a common horizontal plane along a direction of conveyance of the conveyance path so as to vertically curve a surface of the conveyance path.

6. A roller conveyer as described in claim 1, wherein said motor is disposed at an intermediate portion of the conveyance path with respect to the direction of conveyance.

7. A roller conveyer as described in claim 2, wherein said motor is disposed at an intermediate portion of the conveyance path with respect to the direction of conveyance.

8. A roller conveyer as described in claim 3, wherein said motor is disposed at an intermediate portion of the conveyance path with respect to the direction of conveyance.

9. A roller conveyer as described in claim 4, wherein said motor is disposed at an intermediate portion of the conveyance path with respect to the direction of conveyance.

10. A roller conveyer as described in claim 5, wherein said motor is disposed at an intermediate portion of the conveyance path with respect to the direction of conveyance.

11. A roller conveyer as described in claim 1, wherein said roller conveyer is divided into a plurality of conveyer sections along the direction of conveyance of the conveyance path, and engagement between adjacent first gears is broken at a boundary between adjacent conveyer sections; and wherein at least one conveyer section equipped with said motor can change the direction of conveyance.

12. A roller conveyer as described in claim 11, wherein another conveyer is disposed in the vicinity of the conveyer section capable of changing the direction of conveyance such that articles conveyed thereon can be transferred onto the conveyer section from a direction perpendicular to the direction of conveyance of the conveyer section.

13. A roller conveyer as described in claim 2, wherein another conveyer is disposed in the vicinity of the conveyer section capable of changing the direction of conveyance such that articles conveyed thereon can be transferred onto the conveyer section from a direction perpendicular to the direction of conveyance of the conveyer section.

14. A roller conveyer as described in claim 3, wherein said roller conveyer is divided into a plurality of conveyer sections along the direction of conveyance of the conveyance path, and engagement between adjacent first gears is broken at a boundary between adjacent conveyer sections; and wherein at least one conveyer section equipped with said motor can change the direction of conveyance.

15. A roller conveyer as described in claim 14, wherein another conveyer is disposed in the vicinity of the conveyer section capable of changing the direction of conveyance such that articles conveyed thereon can be transferred onto the conveyer section from a direction perpendicular to the direction of conveyance of the conveyer section.

16. A roller conveyer as described in claim 4, wherein said roller conveyer is divided into a plurality of conveyer sections along the direction of conveyance of the conveyance path, and engagement between adjacent first gears is broken at a boundary between adjacent conveyer sections; and wherein at least one conveyer section equipped with said motor can change the direction of conveyance.

17. A roller conveyer as described in claim 16, wherein another conveyer is disposed in the vicinity of the conveyer section capable of changing the direction of conveyance such that articles conveyed thereon can be transferred onto the conveyer section from a direction perpendicular to the direction of conveyance of the conveyer section.

18. A roller conveyer as described in claim 5, wherein said roller conveyer is divided into a plurality of conveyer sections along the direction of conveyance of the conveyance path, and engagement between adjacent first gears is broken at a boundary between adjacent conveyer sections; and wherein at least one conveyer section equipped with said motor can change the direction of conveyance.

19. A roller conveyer as described in claim 18, wherein another conveyer is disposed in the vicinity of the conveyer section capable of changing the direction of conveyance such that articles conveyed thereon can be transferred onto the conveyer section from a direction perpendicular to the direction of conveyance of the conveyer section.

* * * * *